US009995176B2

(12) United States Patent
Belmonte et al.

(10) Patent No.: US 9,995,176 B2
(45) Date of Patent: Jun. 12, 2018

(54) DEVICE FOR TRANSFERRING OIL BETWEEN TWO REPOSITORIES ROTATING RELATIVE TO EACH OTHER, AND PROPELLER TURBOMACHINE FOR AN AIRCRAFT WITH SUCH A DEVICE

(71) Applicant: SNECMA, Paris (FR)

(72) Inventors: Olivier Belmonte, Moissy-Cramayel (FR); Jérémy Phorla Lao, Moissy-Cramayel (FR)

(73) Assignee: SNECMA, Paris (FR)

( * ) Notice: Subject to any disclaimer, the term of this patent is extended or adjusted under 35 U.S.C. 154(b) by 302 days.

(21) Appl. No.: 15/027,666

(22) PCT Filed: Oct. 1, 2014

(86) PCT No.: PCT/FR2014/052486
§ 371 (c)(1),
(2) Date: Apr. 6, 2016

(87) PCT Pub. No.: WO2015/052409
PCT Pub. Date: Apr. 16, 2015

(65) Prior Publication Data
US 2016/0245116 A1    Aug. 25, 2016

(30) Foreign Application Priority Data
Oct. 10, 2013    (FR) ...................................... 13 59868

(51) Int. Cl.
*F01D 25/18*    (2006.01)
*F16H 57/04*    (2010.01)
(Continued)

(52) U.S. Cl.
CPC ............ *F01D 25/186* (2013.01); *B64C 11/48* (2013.01); *F01D 15/12* (2013.01); *F01D 25/16* (2013.01);
(Continued)

(58) Field of Classification Search
CPC ........ F01D 25/186; F01D 25/16; F01D 25/18; F01D 15/12; B64C 11/48; F02C 7/06;
(Continued)

(56) References Cited

U.S. PATENT DOCUMENTS 2,948,554 A * 8/1960 Mahand ............... F16J 15/3448
277/368
3,021,146 A * 2/1962 Sommer ................. F16J 15/54
277/368

(Continued)

FOREIGN PATENT DOCUMENTS

GB    2489021    9/2012
JP    S6227219    2/1987

OTHER PUBLICATIONS

International Search Report with English Language Translation and Written Opinion, dated Jan. 28, 2015, Application No. PCT/FR2014/052486.

*Primary Examiner* — Ninh H Nguyen
*Assistant Examiner* — Topaz L Elliott
(74) *Attorney, Agent, or Firm* — Womble Bond Dickinson (US) LLP

(57) ABSTRACT

The device (20) comprises two outer and inner concentric rings (22, 23), one of which is connected to an oil supply from one of the repositories, the other ring being connected to the other repository, the oil flowing between said rings, and bearings between the rings in order to change repositories between the two rings. According to the invention, the device (20) further comprises a flexible means (31) forming a shock absorber, provided between a first of said rings and an intermediate ring (41) that is separated from a second of said rings by said bearings (25), said flexible means (31) defining a deformable sealed chamber (32) in which oil travels between the two repositories.

12 Claims, 3 Drawing Sheets

(51) Int. Cl.
| | | |
|---|---|---|
| F01D 15/12 | (2006.01) | |
| B64C 11/48 | (2006.01) | |
| F01D 25/16 | (2006.01) | |
| F02C 7/06 | (2006.01) | |
| F16C 27/04 | (2006.01) | |
| F16C 33/66 | (2006.01) | |
| F16C 23/08 | (2006.01) | |
| F01M 11/02 | (2006.01) | |
| F16N 21/00 | (2006.01) | |
| F16C 35/06 | (2006.01) | |
| F16C 19/52 | (2006.01) | |

(52) U.S. Cl.
CPC ............... *F01D 25/18* (2013.01); *F02C 7/06* (2013.01); *F16C 27/045* (2013.01); *F16C 33/6659* (2013.01); *F16H 57/0426* (2013.01); *F01M 11/02* (2013.01); *F05D 2220/32* (2013.01); *F05D 2260/40311* (2013.01); *F05D 2260/98* (2013.01); *F05D 2300/43* (2013.01); *F05D 2300/431* (2013.01); *F16C 19/527* (2013.01); *F16C 23/086* (2013.01); *F16C 35/061* (2013.01); *F16C 2360/23* (2013.01); *F16N 21/00* (2013.01); *Y02T 50/672* (2013.01)

(58) Field of Classification Search
CPC ......... F05D 2260/98; F05D 2260/4031; F16N 21/00; F16L 27/087
USPC .......................................... 475/159, 160, 161
See application file for complete search history.

(56) References Cited

U.S. PATENT DOCUMENTS

2007/0096459 A1* 5/2007 Rocca .................. F16L 27/087
        285/129.1
2010/0111681 A1  5/2010 Nakano et al.

* cited by examiner

DEVICE FOR TRANSFERRING OIL BETWEEN TWO REPOSITORIES ROTATING RELATIVE TO EACH OTHER, AND PROPELLER TURBOMACHINE FOR AN AIRCRAFT WITH SUCH A DEVICE

The present invention relates to an oil transfer device between two reference frames rotating relative to each other, for example one fixed and the other rotary, and more particularly, though not exclusively, between a static casing and a speed reduction device or reducer of a turbine engine comprising a pair of contra-rotating propellers. The invention also relates to such a turbine engine incorporating said oil transfer device.

The architecture of turbine engines comprising a pair of contra-rotating propellers, referred to as "open rotor", is distinguished from that of usual turbojet engines through the fact that the fan is no longer internal but external and is composed of two coaxial contra-rotating propellers that can be located upstream or downstream of the gas generator. Such an architecture gives rise to a lower fuel consumption compared with the multi-flow turbojet engines in service on commercial aircraft.

As shown schematically in FIG. 1, a turboshaft engine 1 comprising a pair of upstream 2 and downstream 3 contra-rotating propellers mainly comprises, along a central longitudinal axis A, two separate parts. A "gas generator" part G is located inside a fixed cylindrical nacelle 4 having a structural casing 5, carried by the structure of the aircraft (such as the rear part of the fuselage of an aircraft), and a "propulsion" part P comprising the pair of contra-rotating propellers 2, 3 constituting the open rotor. This part P, in this example of a turboshaft engine, extends the gas generator part G and the nacelle 4.

The gas generator part G of the turboshaft engine 1 usually comprises, from upstream to downstream in the direction of flow, with respect to the axis A, a gaseous flow F entering the nacelle 4 of the turboshaft engine, one or two compressors 7 depending on the architecture of the single- or twin-spool gas generator, an annular combustion chamber 8, and one or more turbines 9 having distinct pressures depending on said architecture, the shaft 10 of one of which drives, by means of a speed reduction device or epicyclic reducer 11 (referred to as PGB, standing for power gearbox) and in a contra-rotating fashion, the concentric coaxial shafts 12 and 13 of the two upstream 2 and downstream 3 propellers being aligned along the axis A of the turboshaft engine. A nozzle 14 terminates the turboshaft engine 1 in the usual fashion. Moreover, although it is not shown, a control system for varying the pitch of the vanes according to the various flight phases encountered, that is to say the pitch of the contra-rotating propellers, is provided.

In operation and briefly, the airflow F entering the turboshaft engine 1 is compressed, and then mixed with fuel and burnt in the combustion chamber 8. The combustion gases generated then pass into the turbine part 9 in order to drive the propellers 2, 3, which provide the major part of the thrust, into reverse rotation by means of the epicyclic reducer 11. The combustion gases are expelled through the nozzle 14, thus increasing the thrust of the turboshaft engine 1.

The purpose of a reducer (PGB) 11 of an open rotor is to transform what is known as the fast rotation speed of the power turbine 9, the power shaft 10 of which, cooperating with the planetary shaft 15 of the reducer 11, can be seen in the schematic FIG. 2, into two separate speeds, referred to as slow, of the two propellers. For this purpose, in the example shown, the shaft 12 of the upstream propeller 2 terminates in an annular bulb 16 so as to be rotationally fixed to the planet carrier 17 of the reducer, the planet gears 18 of the planet carrier meshing with the planetary shaft 15 of the reducer. In turn, the shaft 13 of the downstream propeller 3 is rotationally fixed to an outer toothed ring 19 of the reducer, meshing around the planet gears.

A specific feature of this reducer 11 is therefore that it does not have any static component and is considered to be a differential reducer comprising an epicyclic gear train and having, at its input, an initial rotation speed (that of the turbine) and, at its output, two separate rotation speeds in opposite directions (those of the two fan stages).

Thus, in order to guarantee optimum and reliable functioning of the reducer 11, it is essential to convey oil to lubricate and cool the running components that constitute said reducer, taking account of the fact that this reducer is subjected to the various forces of the input (turbine) and output (propeller) shafts while suffering significant external mechanical and thermal stresses caused by the turbine engine.

For this purpose, as shown by FIGS. 1 and 2, an oil transfer device 20, connected to an oil supply source 21 located in the fixed nacelle 4, is provided for lubricating the reducer and is located on the upstream side thereof, turned towards the turbine, the downstream side being turned towards the propeller shafts.

The transfer device 20 mainly comprises (FIG. 2) two outer 22 and inner 23 concentric rings spaced apart radially from each other, the outer ring 22 being fixed to a static casing 24 of the turbine body 9 and the inner ring 23 being rigidly connected to the planet carrier 17 of the reducer. In order to pass the rotation between the fixed outer ring 22 connected to the static casing (fixed reference frame) and the rotating inner ring 23 connected to the reducer (rotary reference frame), plain or roller bearings 25 are arranged between the rings.

A supply pipe 26 emerging from the source 21 passes through one of the radial arms 27 (FIG. 1) provided between the structural casing 5 of the nacelle 4 and the static casing 24 of the turbine body 9, in order to be connected to the outer ring 22 of the transfer device 20. The oil thus enters the space between the rings and emerges from the inner ring 23 in the direction of the planet carrier 17 in order to lubricate the inside of the reducer (planet carrier 17, planet gears 18, planetary shaft 15 and annulus gear 19).

Moreover, the transmission shafts 12, 13 are guided by bearings 28, 29 located on the downstream side of the reducer and thus opposite to the side where the transfer device 20 is located. In particular, two bearings 28 are provided between the two concentric shafts 12, 13 of the propellers and two other bearings 29 between the outer shaft 12 of the upstream propeller and a static casing 30 of the inner body of the engine.

It is therefore possible for the rotary reducer (PGB) 11 to be able to have variations in positions that are both radial and angular with respect to the rest of the turbine engine 1, in particular the static casings, which is not desirable. However, such variations may give rise to misalignments between the axis of the reducer 11 and the axis of the oil transfer device 20 since said device is connected to the reducer and to the static casing in question. Such misalignments may consequently lead to mechanical problems between these components, taking account of the high rotation speeds, leakages and/or poor lubrication of the reducer.

The present invention aims to provide a solution to the above drawbacks by proposing an oil transfer device, the design of which completely annihilate any misalignments.

For this purpose, the oil transfer device between two reference frames rotating relative to each other, such as a static casing and a speed reduction device of a turbine engine, comprising:
two outer and inner concentric rings, one of which is connected to an oil supply issuing from one of the reference frames, and the other one of which is connected to the other one of the reference frames, the oil circulating between said rings, and
bearings between the rings for changing reference frames between said rings,
is remarkable in that it also comprises a flexible means forming a damper, provided between a first of said rings and an intermediate ring that is separated from a second of said rings by said bearings, said flexible means defining a deformable sealed chamber in which the oil passes between the two reference frames.

Thus, by virtue of the invention, due to the flexible and deformable nature of said means, the transfer device can follow the various movements of the speed reduction device (PGB), the oil circulating through the deformable chamber defined between the rings providing the damping of the external stresses, while guaranteeing good lubrication of the components of the reduction device. Misalignments, in particular radial and angular, are thus corrected, so that correct alignment is preserved between the two reference frames. The transfer device is thus capable of withstanding variations in position of the reducer.

Preferably, communication holes are provided in the outer, intermediate and inner rings for circulation of the oil.

Advantageously, the communication holes provided in the outer ring and the inner ring are designed to allow the entire transfer of oil between the two reference frames by the device. Thus the device can be connected by these outer and inner rings to two oil circuits rotating relative to each other and between which said device allows the transfer of oil.

Advantageously, the bearings are arranged so as to define, together with the parts of said second ring and of the intermediate ring where said communication holes are provided, a space in which the oil passes between the two reference frames.

In a preferred embodiment, the flexible means forming a damper comprises two radial annular flanges, fixed sealingly between the intermediate ring and said first ring, said deformable oil-circulation chamber being delimited by the corresponding flanges and rings.

The oil in the chamber damps the external stresses and the flexible shapes of the flanges make it possible, in the aforementioned application for example, for the transfer device to follow the movements of the reducer without the risk of causing problems between said components, while lubricating the inside of the reducer.

In another embodiment, the flexible means forming a damper is in the form of a flexible annular enclosure, attached in a stationary manner between the intermediate ring and said first ring, said oil-circulation chamber being delimited by the enclosure.

Moreover, the flexible means can be produced from various materials, provided that it offers acceptable flexibility or elastic deformation and guarantees suitable reliability of functioning from the point of view of both mechanical strength and thermal resistance. For example, a polymer, synthetic or natural plastics material, an elastomer, a metal or a composite material may be suitable.

In the above application, the reference frame to which the ring connected to the oil supply is connected is fixed and is connected to the static casing of the turbine engine, and the other one of the reference frames is rotary and connected to the speed reduction device.

Advantageously, the flexible means is provided between the fixed ring and the intermediate ring inside which the bearings are arranged.

It could also be envisaged to provide the flexible means between the rotary ring and the intermediate ring outside which the bearings are then mounted.

Preferably, the fixed and rotary concentric rings are the outer and inner rings respectively.

The invention also relates to a turbine engine, in particular for an aircraft, of the type comprising a gas generator part and a propulsion part comprising a pair of coaxial contra-rotating propellers driven by means of a differential epicyclic reducer connected to a turbine of the gas generator part and lubricated by an oil transfer device.

Advantageously, the oil transfer device is as defined previously.

The figures of the accompanying drawing will give a clear understanding as to how the invention can be implemented. In these figures, identical references designate similar elements.

Figure 1:
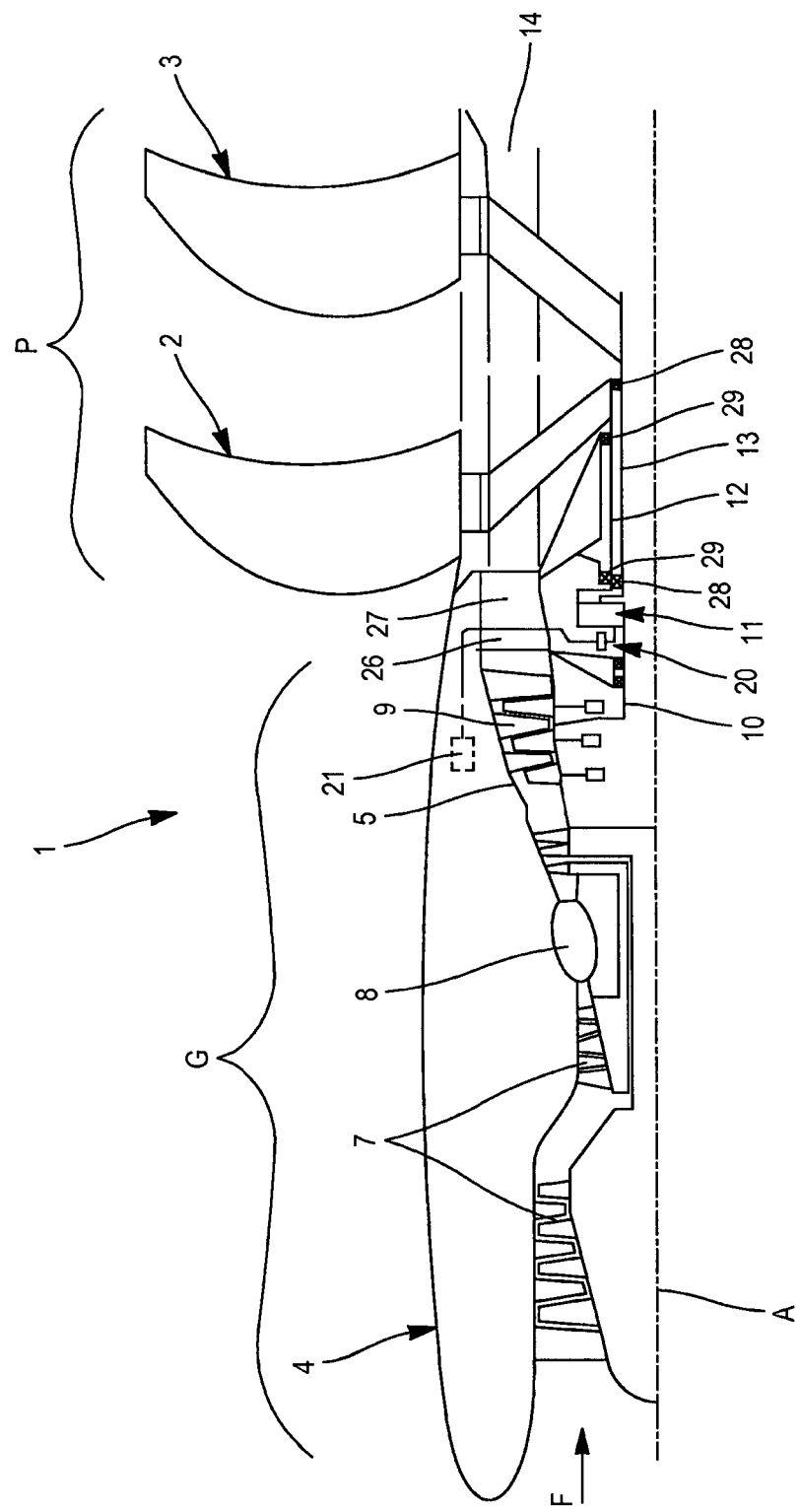
FIG. 1 is a schematic view in longitudinal half-section of a turbine engine comprising a pair of contra-rotating propellers, such as an open-rotor turbine engine.
Figure 2:
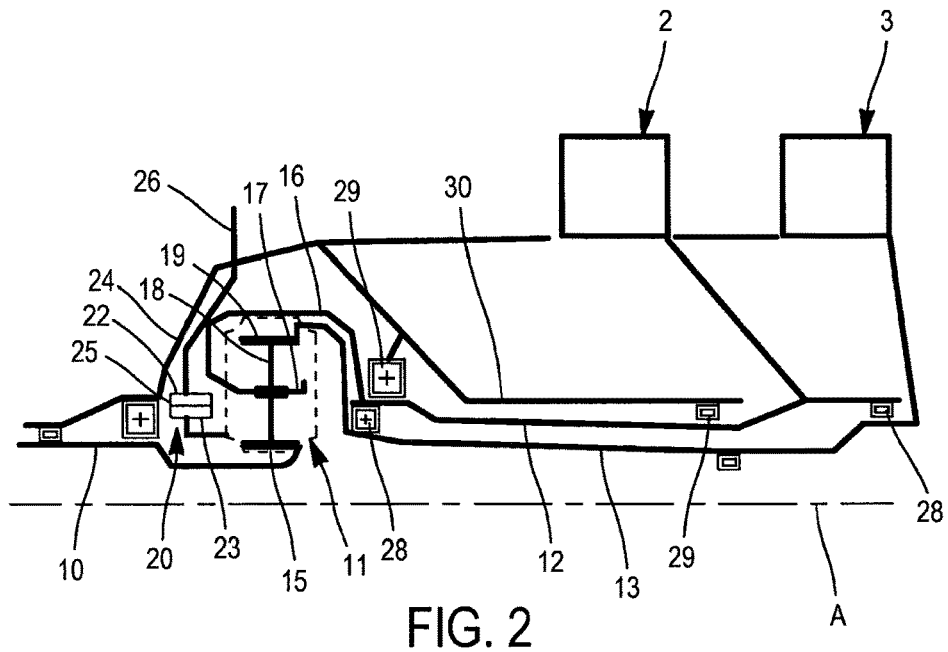
FIG. 2 is an enlarged view of FIG. 1, showing in particular, schematically, the oil transfer device having integrated deformable means, in accordance with the invention, between a static turbine casing and the speed reduction device, which is rotary.

The oil transfer device 20 according to the invention is described in detail with reference to FIG. 3 and makes it possible to bring the lubricating oil arriving from the static casing (fixed reference frame) of the turbine engine to the speed reduction device or PGB reducer 11 (rotary reference frame) driving the shafts of the propellers. The path of the oil has been represented by arrows T. The device 20 is positioned in an annular inner space of the turbine engine 1, located around the turbine shaft 10 and delimited between the fixed casing 24 thereof and the upstream side of the PGB reducer 11.

In the embodiment shown, the oil transfer device 20 comprises the fixed outer annular ring 22, the rotating inner annular ring 23, the bearings 25 such as roller bearings between the two rings and, according to the invention, a flexible means 31 forming a damper intended to define a sealed and deformable annular chamber 32 in which the lubricating oil flows in the direction of the reducer.

Figure 4:
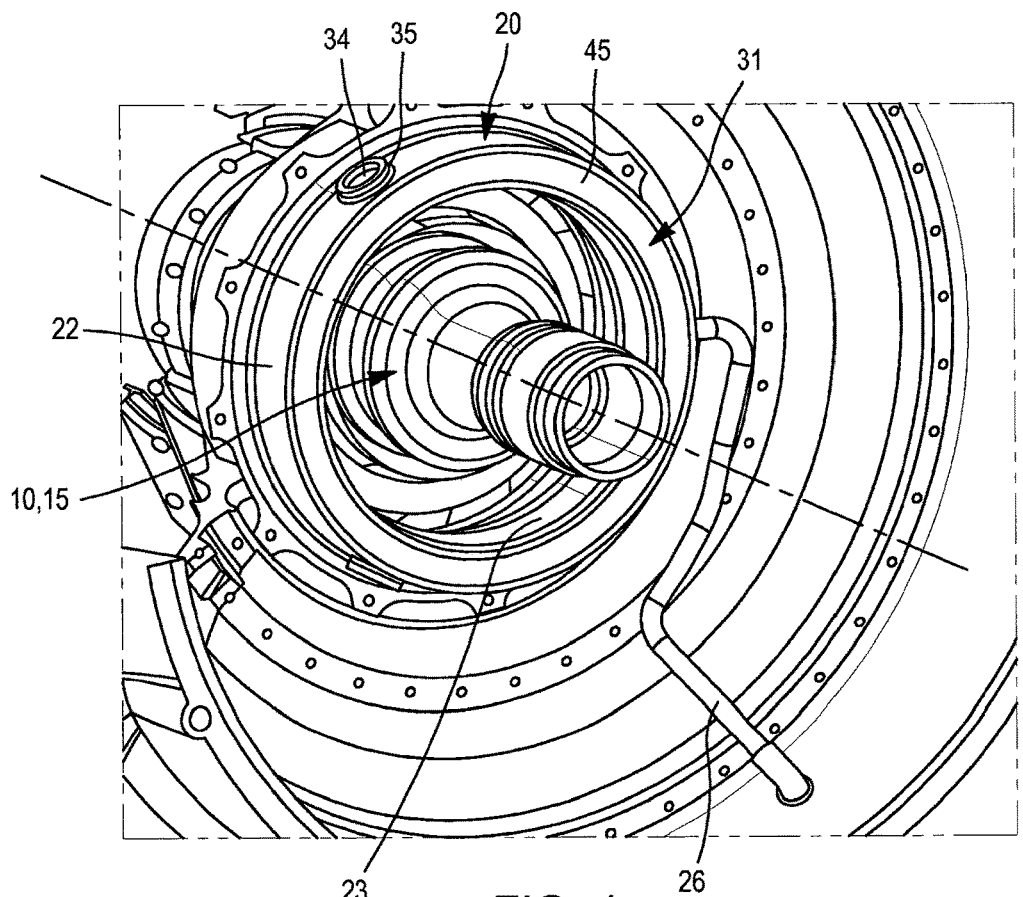
FIG. 4 is a partial perspective view of the oil supply to the transfer device comprising deformable means from the static casing of the turbine engine.
Figure 3:
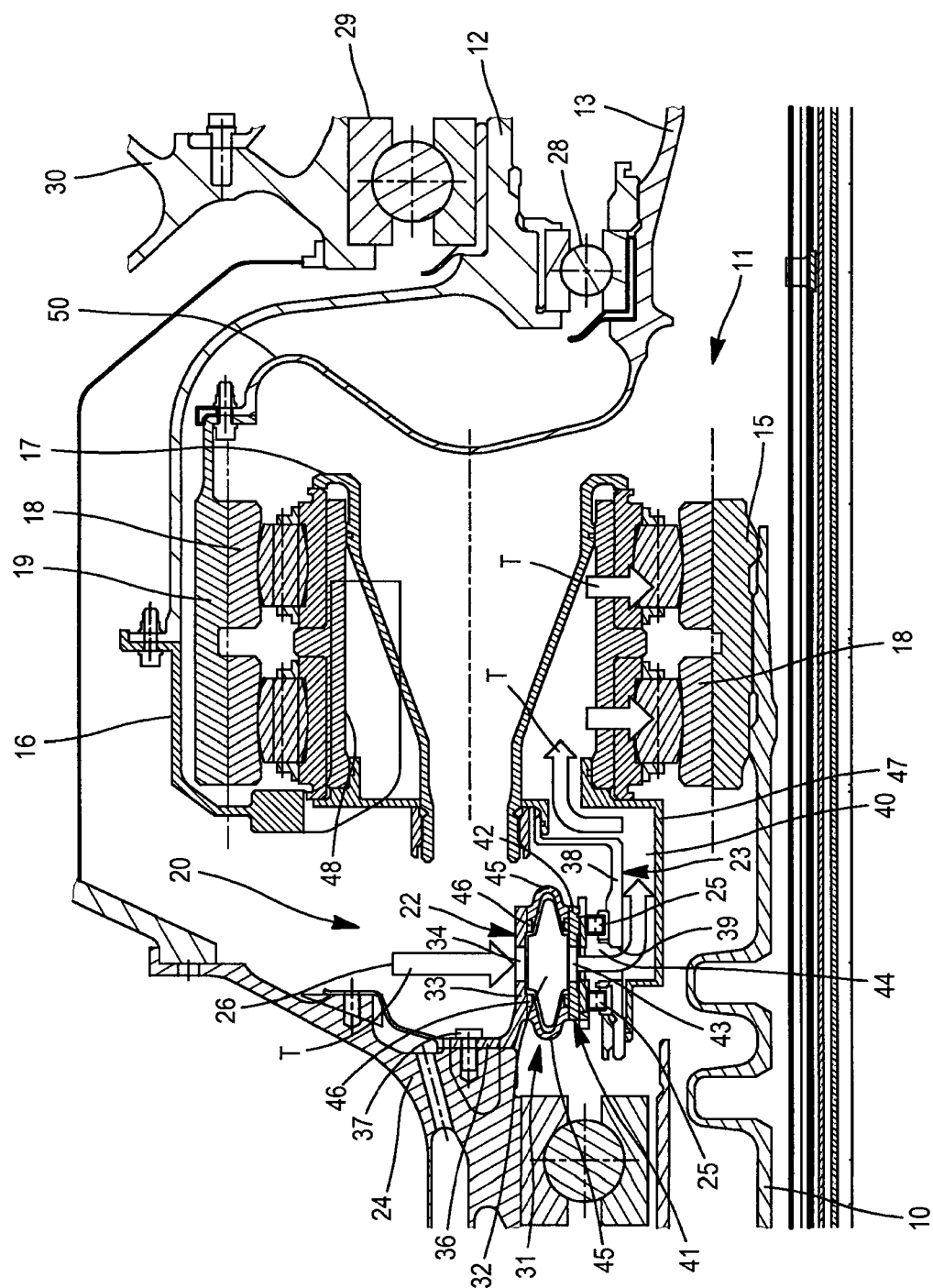
FIG. 3 is a detailed longitudinal half-section of an embodiment of the oil transfer device including, in accordance with the invention, the deformable means, arranged between the static casing and the reduction device.

In particular, in the lateral wall 33 of the outer ring 22, radial inlet holes 34 are provided, to which the respective oil feed pipes 26 coming from the fixed casing are connected, as shown in perspective in FIG. 4 (only one pipe being shown) and the arrow T in FIG. 3. A protrusion 35 for connecting the corresponding pipe 26 is provided for this purpose on the wall 33 around each inlet hole 34. The outer ring 22 also has an outer radial end rim 36 that is rigidly connected to the static casing 24 of the power turbine 9 by fixing members (screws) 37. The outer ring 22 is thus connected to the fixed reference frame (the static casing).

The inner ring 23 is in turn rigidly connected to the PGB reducer 11 or, more precisely, to an intermediate cylindrical part 47 of the rotary planet carrier 17. The inner ring is thus connected to the rotary reference frame. In the lateral wall 38 of said ring, radial outlet holes 39 are provided, enabling the oil to be conveyed, by means of respective passages 40 between the ring 23 and the part 47, into the rotary reference frame as far as the inside of the reducer 11 in the direction of the arrows T.

Between the two annular rings 22 and 23 of the transfer device 20, there are the two bearings 25 which are mounted, in this embodiment, between the inner ring 23 and an intermediate annular ring 41. Thus the two bearings 25, which are spaced apart axially, bear on the lateral wall 38 of the inner ring 23 and on the lateral wall 42 of the intermediate ring 41, and provide the change of reference frames.

The flexible means forming a damper 31 is, in this example, provided between the lateral wall 42 of the intermediate ring 41 and the lateral wall 33 of the outer ring 22 so as to create the sealed deformable inner chamber 32 in which the lubricating oil arrives and then circulates. For this purpose, through-holes 43 are provided in the lateral wall 42 of the intermediate ring in order to bring the sealed chamber 32 of the flexible means 31 into fluid communication with the space 44 between the bearings 25, and therefore as far as the outlets 39 of the inner ring and passages 40 leading to the inside of the reducer 11. Thus the oil is in continuous circulation in the transfer device 20, passing through the chamber, the space and the passages.

In the example described with reference to FIG. 3, the flexible means 31 is defined by two deformable annular flanges or membranes 45, spaced apart parallel to each other and attached substantially at the ends of the outer 22 and intermediate 41 rings. It can be seen, in particular in FIG. 3, that the outer and inner peripheries of these flanges 45 are fixed to the lateral walls 33, 42 respectively of the outer ring and of the intermediate ring by means, furthermore, of the annular sealed fixing means 46. It will be noted that the flanges are identical and are in the form of bellows, in opposition to each other, offering flexibility and elastic deformation.

Depending on the chosen material, which must give them the appropriate flexibility and allow elastic deformation thereof in order to follow the movements of the reducer, the flanges 45 may be welded to the rings by welding if they are produced from metal material, or adhesively bonded if they are produced from synthetic or natural plastics material, from an elastomer for example. Naturally, the material is chosen so as to guarantee, in addition to their elastically deformable nature, mechanical strength and thermal resistance of the flanges during the functioning of the turbine engine and thus provide reliability and longevity for the transfer device 20.

The inner sealed chamber 32 of the flexible means 31 is thus filled with lubricating oil, which provides damping of the external stresses between the reducer 11 and the fixed outer ring 22 of the transfer device 20 by means of the flexibility of the annular flanges 45, which thus make it possible to follow the movements of the reducer, while guaranteeing lubrication of the reducer. Thus, any misalignments liable to be produced by the reducer are followed and corrected by the flexible damping means 31 of the transfer device 20, without causing any mechanical problems therebetween. It should be noted that the internal volume of the chamber remains substantially constant, but that it deforms at the flanges depending on the stresses received.

The cross section of the flexible means 31 forming a damper, which defines the sealed inner chamber 32 filled with oil, could be different from that shown using the bellows-like flanges. Indeed, said flanges could be curved, inclined, stepped or even simply rectilinear, that is to say radial, provided that appropriate flexibility is provided.

A description of the differential reducer 11 having a reversed epicyclic gear train with opposite rotation of the two upstream 2 and downstream 3 propellers is given below.

As shown by FIG. 3, said reducer comprises, with respect to the longitudinal axis A, the input planetary shaft 15 in the form of a toothed wheel, which is mounted by means of a splined connection on the turbine shaft 10 rotating in one rotation direction while driving the reducer 11. There are three planet gears 18, arranged at 120° relative to one another (only one of them being visible in the figure), that mesh around the input shaft 15 and are supported by the planet carrier 17 consequently rotating in the opposite direction of rotation to the input shaft. The outer annulus gear 19 meshes with the planet gears and rotates in the same rotation direction as the input shaft 15 and in the opposite direction to the planet carrier 17.

The planet carrier 17 therefore comprises three parallel hollow shafts 50 on which the planet gears 18 are respectively mounted, corresponding in this example to two identical bearings (roller bearings) mounted so as to be aligned and spaced apart from each other. The hollow shafts 50 are interconnected by the planet carrier. The intermediate cylindrical part 47 is engaged in the three hollow shafts, while being rigidly connected to the planet carrier, and conveys the oil issuing from the passages 40 into the inside of these shafts and then, as shown by the arrows T, into the planet gears, the annulus gear and the planetary shaft of the reducer 11.

By virtue of the flexible means forming a damper 31 provided between the fixed and rotary rings, the oil transfer device 20 can thus withstand the variations in angular and/or radial positions of the PGB reducer, to which the rotary ring 23 is connected, relative to the static casing, to which the fixed ring 22 is connected.

In a variant that is not shown, the flexible means can be in the form of a flexible annular enclosure like an air chamber. The flexible annular enclosure is then arranged between the rings concerned while being rigidly connected thereto. Openings are provided in the wall of the enclosure to allow circulation of oil from the inlets of the outer ring as far as the outlet passages leading to the reducer, passing through the sealed inner chamber of the flexible annular enclosure.

In a similar manner to the previous embodiment in flange form, this embodiment of the flexible means damps external stresses and follows the movements of the reducer (misalignments) while guaranteeing lubrication. The cross section is not limited to a strictly circular cross section, but could be elliptical, oval, flattened cylindrical, etc., without departing from the scope of the invention.

The invention claimed is:
1. Oil transfer device between two reference frames rotating relative to each other, comprising:
an outer ring and a concentric inner ring, one of which is connected to an oil supply issuing from one of the reference frames, and the other one of which is connected to the other one of the reference frames, the oil circulating between said rings, and bearings between the rings in order to change reference frames between said rings, a flexible means forming a damper, provided between a first of said rings and an intermediate ring that is separated from a second of said rings by said bearings, said flexible means defining a deformable sealed chamber in which the oil travels between the two reference frames.

2. Device according to claim 1, wherein communication holes are provided in the outer, intermediate and inner rings for circulation of the oil.

3. Device according to claim 2, wherein the communication holes provided in the outer ring and the inner ring are designed to allow the entire transfer of oil between the two reference frames by the device.

4. Device according to claim 2, wherein the bearings are arranged so as to define, together with the parts of said second ring and of the intermediate ring where said communication holes are provided, a space in which the oil passes between the two reference frames.

5. Device according to claim 1, wherein the flexible means forming a damper comprises two radial annular flanges, fixed sealingly at their peripheries between the intermediate ring and said first ring, said deformable oil-circulation chamber being delimited by the corresponding flanges and rings.

6. Device according to claim 1, wherein the flexible means forming a damper is in the form of an annular flexible enclosure, attached in a stationary manner between the intermediate ring and said first ring, said oil-circulation chamber being delimited by the enclosure.

7. Device according to claim 1, wherein the reference frame to which the ring connected to the oil supply is connected is fixed and is connected to the static casing of the turbine engine, and the other one of the reference frames is rotary and is connected to the speed reduction device.

8. Device according to claim 1, wherein the fixed and rotary concentric rings are the outer and inner rings respectively.

9. Device according to claim 1, wherein the flexible means is produced from a polymer, synthetic or natural plastic material, an elastomer, a metal or a composite material providing elastic deformation and sealing.

10. Device according to claim 1, wherein the two reference frames are a static casing and a speed reduction device.

11. Turbine engine comprising a gas generator part and a propulsion part comprising a pair of contra-rotating upstream and downstream coaxial propellers, rotated by means of a differential speed reduction device connected to a turbine of the gas generator part, and lubricated by means of an oil transfer device as defined according to claim 1.

12. An aircraft including a turbine engine as defined in claim 11.

* * * * *